(12) United States Patent
Nakamura

(10) Patent No.: US 8,859,149 B2
(45) Date of Patent: Oct. 14, 2014

(54) ANODE FOR LITHIUM ION SECONDARY BATTERY, LITHIUM ION SECONDARY BATTERY, ELECTRIC POWER TOOL, ELECTRICAL VEHICLE, AND ELECTRIC POWER STORAGE SYSTEM

(75) Inventor: Toshikazu Nakamura, Fukushima (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 13/111,395

(22) Filed: May 19, 2011

(65) Prior Publication Data

US 2011/0300444 A1 Dec. 8, 2011

(30) Foreign Application Priority Data

Jun. 3, 2010 (JP) ................................ 2010-127897

(51) Int. Cl.

| | | |
|---|---|---|
| *H01M 4/13* | (2010.01) | |
| *H01M 4/62* | (2006.01) | |
| *H01M 4/136* | (2010.01) | |
| *H01M 4/58* | (2010.01) | |
| *H01M 4/36* | (2006.01) | |
| H01M 10/0566 | (2010.01) | |
| H01M 4/38 | (2006.01) | |
| H01M 4/60 | (2006.01) | |
| H01M 4/485 | (2010.01) | |
| H01M 10/0525 | (2010.01) | |

(52) U.S. Cl.
CPC ............. *H01M 4/136* (2013.01); *H01M 4/623* (2013.01); *H01M 10/0566* (2013.01); *H01M 4/38* (2013.01); *H01M 4/386* (2013.01); *H01M 4/608* (2013.01); *H01M 4/485* (2013.01); *H01M 4/582* (2013.01); *Y02T 10/7011* (2013.01); *Y02E 60/122* (2013.01); *H01M 4/364* (2013.01); *H01M 10/0525* (2013.01)

USPC .................... 429/231.95; 429/218.1; 429/217; 429/231.4; 429/231.8; 429/232; 429/233; 252/182.1

(58) Field of Classification Search
CPC ...... H01M 4/136; H01M 4/134; H01M 4/364; H01M 4/386; H01M 4/485; H01M 4/582; H01M 4/583; H01M 4/623; H01M 4/64; H01M 10/0525; H01M 2004/027

USPC ............ 429/231.95, 218.1, 217, 231.4, 231.8, 429/232, 233; 252/182.1; 310/50; 320/137

See application file for complete search history.

(56) References Cited

U.S. PATENT DOCUMENTS

| | | | |
|---|---|---|---|
| 2004/0121235 A1 * | 6/2004 | Amatucci | 429/231.95 |
| 2005/0147888 A1 | 7/2005 | Yamamoto et al. | |
| 2007/0122701 A1 | 5/2007 | Yamaguchi | |
| 2008/0176132 A1 | 7/2008 | Hirose et al. | |

FOREIGN PATENT DOCUMENTS

| | | |
|---|---|---|
| CN | 101872861 | * 10/2010 |
| JP | 1999-250896 | 9/1999 |
| JP | 2003-0095 | 1/2003 |
| JP | 2003-217574 | 7/2003 |
| JP | 2004-228059 | 8/2004 |
| JP | 2005-063767 | 3/2005 |
| JP | 2007-141666 | 6/2007 |
| JP | 2007-257866 | 10/2007 |
| JP | 2007-257868 | 10/2007 |
| JP | 2008-016195 | 1/2008 |
| JP | 2008-016196 | 1/2008 |

* cited by examiner

*Primary Examiner* — Laura Weiner

(74) *Attorney, Agent, or Firm* — K&L Gates LLP

(57) ABSTRACT

A lithium secondary battery that has high capacity and excellent cycle characteristics is provided. The lithium ion secondary battery includes a cathode, an anode, and an electrolyte. The anode has, on an anode current collector, an anode active material layer including $Li_xSiF_y$ ($1 \leq x \leq 2$ and $5 \leq y \leq 6$) as an anode active material.

10 Claims, 11 Drawing Sheets

ANODE FOR LITHIUM ION SECONDARY BATTERY, LITHIUM ION SECONDARY BATTERY, ELECTRIC POWER TOOL, ELECTRICAL VEHICLE, AND ELECTRIC POWER STORAGE SYSTEM

CROSS REFERENCES TO RELATED APPLICATIONS

The present disclosure claims priority to Japanese Priority Patent Application JP2010-127897 filed in the Japan Patent Office on Jun. 3, 2010, the entire contents of which is hereby incorporated by reference.

BACKGROUND

The present disclosure relates to an anode for a lithium ion secondary battery that contains an anode active material containing silicon (Si) as an element, a lithium ion secondary battery including the same, an electric power tool using the lithium ion secondary battery, an electrical vehicle using the lithium ion secondary battery, and an electric power storage system using the lithium ion secondary battery.

In recent years, portable electronic devices such as video cameras, digital still cameras, mobile phones, and notebook personal computers have been widely used, and it is strongly demanded to reduce their size and weight and to achieve their long life. Accordingly, as a power source for the portable electronic devices, a battery, in particular a small and light-weight secondary battery capable of providing a high energy density has been developed.

Specially, a secondary battery using insertion and extraction of lithium for charge and discharge reaction (lithium ion secondary battery) is extremely prospective, since such a secondary battery is able to provide a higher energy density compared to a lead battery and a nickel cadmium battery.

The lithium ion secondary battery includes a cathode, an anode, and an electrolytic solution. The anode has an anode active material layer provided on an anode current collector. The anode active material layer contains an anode active material that is involved in the charge and discharge reaction.

A the anode active material, a carbon material has been widely used. However, in recent years, as further improvement in battery capacity is demanded, the use of silicon is being considered. Since the theoretical capacity of silicon (4199 mAh/g) is significantly higher than the theoretical capacity of graphite (372 mAh/g), it is expected that the battery capacity is thereby highly improved. In this case, the anode active material is not limited to a simple substance of silicon, and alloys and compounds thereof are also being considered.

However, in the case where silicon is used as the anode active material, while the battery capacity improves, some disadvantages occur. Specifically, since the anode active material intensely expands and shrinks during charge and discharge, the anode active material layer is easily pulverized. Further, since reactivity of the anode active material is high, decomposition of the electrolytic solution easily occurs.

Therefore, various studies are being conducted to improve various performances of the lithium ion secondary battery using silicon as the anode active material.

To improve charge and discharge characteristics, metal particles (particle size=0.0005 μm to 10 μm, both inclusive) are provided on a surface of an electrode active material in the cathode or the anode (for example, see Japanese Unexamined Patent Application Publication No. Hei 11-250896). To suppress increase in resistance within the battery and decrease in capacity, a second active material layer that contains metal and the like that forms an alloy with the lithium ion, and metal and the like that does not form an alloy with the lithium ion, is provided on a first active material layer that inserts and extracts lithium ions (for example, see Japanese Unexamined Patent Application Publication No. 2003-217574). To improve charge and discharge cycle characteristics, metal is contained on the surface of a thin film of which the main constituent is silicon (for example, see Japanese Unexamined Patent Application Publication No. 2003-007295). To improve cycle life, a surface coating layer composed of a conductive material having low lithium-compound forming ability is provided on an active material layer composed of a silicon material (for example, see Japanese Unexamined Patent Application Publication No. 2004-228059). To improve charge and discharge cycle characteristics, the surfaces of silicon-containing particles (average particle size $(D_{50})$=0.1 μm to 10 μm, both inclusive) are coated with a metal thin film (for example, see Japanese Unexamined Patent Application Publication No. 2005-063767). To obtain excellent charge and discharge efficiency, an anode material is used in which the surface of a reaction portion containing silicon is provided with a coated portion composed of a metal oxide (for example, see Japanese Unexamined Patent Application Publication No. 2007-141666). To improve electron conductivity, the anode active material layer contains a ferromagnetic metal (for example, see Japanese Unexamined Patent Application Publication No. 2007-257866). In this case, the anode active material layer has magnetization, and a maximum magnetization intensity obtained by a magnetization curve is 0.0006 T (tesla) or more. To reduce stress concentration and improve characteristics, a metal element is contained within the anode active material layer such that concentration increases and then decreases in the thickness direction (for example, see Japanese Unexamined Patent Application Publication No. 2007-257868). To reduce excess voltage at initial charging, at least a portion of the surfaces of the particles of the active material is coated with a metal material having low lithium-compound forming ability (for example, see Japanese Unexamined Patent Application Publication Nos. 2008-016195, 2008-016196, 2008-016198, 2008-066278, and 2008-277156).

SUMMARY

The recent portable electronic devices are becoming increasingly high-performance and multi-functional, and thereby power consumption thereof tends to increase. In addition, it has been considered to also apply the lithium ion secondary battery to large-scale applications, such as electrical vehicles. Accordingly, it is expected that charge and discharge of the lithium ion secondary battery will be frequently repeated, and thus the cycle characteristics will become easily lowered.

view of the foregoing, in the disclosure, it is desirable to provide an anode for a lithium ion secondary battery capable of improving the cycle characteristics while being high capacity, a lithium ion secondary battery using the same, an electric power tool using the foregoing lithium ion secondary battery, an electrical vehicle using the foregoing lithium ion secondary battery, and an electric power storage system using the foregoing lithium ion secondary battery.

According to an embodiment of the disclosure, there is provided an anode for a lithium ion secondary battery that has an anode active material layer including $Li_xSiF_y$ ($1 \le x \le 2$ and $5 \le y \le 6$) as an anode active material provided on an anode current collector. Further, according to an embodiment of the disclosure, there is provided a lithium ion secondary battery including the foregoing anode of the disclosure, a cathode, and an electrolyte. Further, according to an embodiment of the disclosure, there is provided an electric power tool, an electrical vehicle, and an electric power storage system that use the foregoing lithium ion secondary battery as a power source or an electric power storage source.

According to the anode for a lithium ion secondary battery, and the lithium ion secondary battery of the embodiments of the disclosure, the anode active material layer is structured including $Li_xSiF_y$ ($1 \leq x \leq 2$ and $5 \leq y \leq 6$) as an anode active material. Thereby, volume expansion is able to be inhibited while increasing the amount of lithium insertion. Thus, by using silicon as the anode active material, structural breakage of the anode active material layer accompanying repeated charge and discharge is able to be inhibited and cycle characteristics are able to be improved, while actualizing higher capacity. In addition, according to the electric power tool, the electrical vehicle, and the electric power storage system of the embodiments of the disclosure, since a lithium ion secondary battery with superior cycle characteristics is able to be used, the electric power tool, the electrical vehicle, and the electric power storage system are able to be used over a longer period of time.

Additional features and advantages are described herein, and will be apparent from the following Detailed Description and the figures.

DETAILED DESCRIPTION

Embodiments of the present application will be described below in detail with reference to the drawings.

Figure 1:
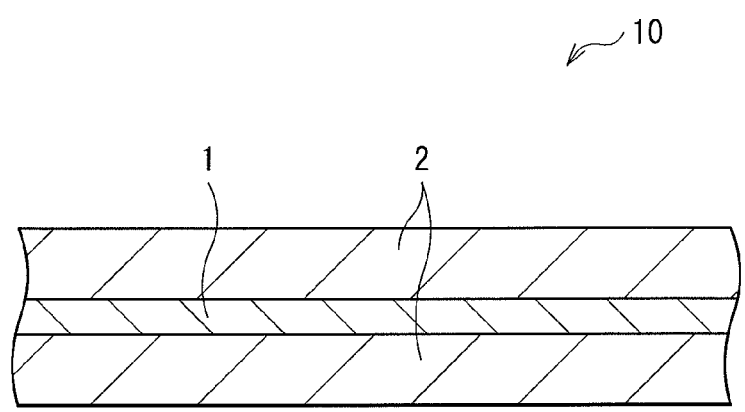
FIG. 1 is a cross sectional view illustrating a structure of an anode as a first embodiment of the disclosure.

The description will be given in the following order.
1. First embodiment (anode)
2. Second embodiment (example of a first secondary battery to a third secondary battery including the foregoing anode)
  2-1. First secondary battery (cylindrical type)
  2-2. Second secondary battery (laminated film type)
  2-3. Third secondary battery (square type)
3. Application of a lithium ion secondary battery 1. First Embodiment Anode Whole Structure of an Anode FIG. 1 illustrates a cross sectional structure of an anode 10 as a first embodiment of the disclosure. The anode 10 is used in electrochemical devices, such as lithium ion secondary batteries, and has an anode current collector 1 having a pair of opposing faces, and an anode active material layer 2 provided on the anode current collector 1. The anode active material layer 2 may be provided on both faces or on one face of the anode current collector 1.

The anode current collector 1 is preferably made of a metal material having favorable electrochemical stability, favorable electric conductivity, and favorable mechanical strength. Examples of the metal material include copper (Cu), nickel (Ni), and stainless steel. Specially, copper is preferable as the metal material, since a high electric conductivity is able to be thereby obtained.

In particular, the metal material composing the anode current collector 1 preferably contains one or more metal elements not forming an intermetallic oxide with an electrode reactant. If the intermetallic oxide is formed with the electrode reactant, lowering of the current collectivity characteristics and separation of the anode active material layer 2 from the anode current collector 1 easily occur, since the anode current collector 1 is broken by being affected by a stress due to expansion and shrinkage of the anode active material layer 2 at the time of charge and discharge. Examples of the metal elements include copper, nickel, titanium (Ti), iron (Fe), and chromium (Cr).

Further, the foregoing metal material preferably contains one or more metal elements being alloyed with the anode active material layer 2. Thereby, the contact characteristics between the anode current collector 1 and the anode active material layer 2 are improved, and thus the anode active material layer 2 is less likely to be separated from the anode current collector 1. For example, in the case that the anode active material of the anode active material layer 2 contains silicon (Si), examples of metal elements that do not form an intermetallic oxide with the electrode reactant and are alloyed with the anode active material layer 2 include copper, nickel, and iron. These metal elements are preferable in terms of the strength and the electric conductivity as well.

The anode current collector 1 may have a single layer structure or a multilayer structure. In the case where the anode current collector 1 has the multilayer structure, for example, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 opposed to the anode active material layer 2 is roughened. Examples of roughening methods include a method of forming fine particles by electrolytic treatment. The electrolytic treatment is a method of providing concavity and convexity by forming fine particles on the surface of the anode current collector 1 by electrolytic method in an electrolytic bath. A copper foil provided with the electrolytic treatment is generally called "electrolytic copper foil."

Ten point height of roughness profile Rz of the surface of the anode current collector 1 is, for example, preferably from 1.5 μm to 6.5 μm both inclusive, since thereby the contact characteristics between the anode current collector 1 and the anode active material layer 2 are more improved.

Anode Active Material Layer

The anode active material layer 2 is structured to contain, as an anode active material, one or more types of an anode material capable of inserting and extracting lithium that is an electrode reactant. The anode active material layer 2 may contain other material, such as an anode electrical conductor or an anode binder, in addition to the foregoing anode active material according to needs. Details regarding the anode electrical conductor and the anode binder are similar, for example, to those of a cathode conductive agent and a cathode binder, described hereafter.

The anode active material layer 2 contains a compound expressed by $M_xSiF_y$ ($1 \leq x \leq 2$, $5 \leq y \leq 6$) as such an anode material. Preferably, the anode active material layer 2 contains lithium fluorosilicate ($Li_xSiF_y$ ($1 \leq x \leq 2$, $5 \leq y \leq 6$)).

For example, $Li_2SiF_6$ has an octahedron structure in which fluorine atoms are arranged around a silicon element positioned in the center. Since the lithium ions are coordinated near the fluorine atoms, electron density of the fluorine atoms is affected by movement of electrons to the silicon atom. Thereby, insertion and extraction of lithium is smoothly repeated. Further, $Li_2SiF_6$ is a solid powder, and solubility to the non-aqueous electrolyte solvent used in the lithium ion secondary battery is extremely low. Even if the fluorine atoms become five as a result of the state of valence modification of silicon, $Li_2SiF_6$ does not liquefy, and is therefore suitable as the anode active material in terms of stability as well.

In addition, a material (metal material) in which at least one type of metal element or metalloid element is an element may also be contained as the anode material, since thereby a high energy density is able to be obtained. The metal material may be a simple substance, an alloy, or a compound of the metal element or metalloid element; or a metal material having one or more phases thereof at least in part.

The foregoing metal element or metalloid element is, for example, a metal element or a metalloid element capable of forming an alloy with the electrode reactant, and is specifically one or more of the following elements. That is, the foregoing metal element or the foregoing metalloid element is one or more of magnesium (Mg), boron (B), aluminum (Al), gallium (G), indium (In), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Specially, silicon or tin is preferable, and silicon is more preferable, since further high energy density is able to be obtained.

A material containing silicon (silicon-containing material) may be a simple substance, an alloy, or a compound of silicon; or a material having one or more phases thereof at least in part. Examples of alloys of silicon include a material having one or more of the following elements as an element other than silicon. Such an element other than silicon is tin, nickel, copper, iron (Fe), cobalt (Co), manganese (Mn), zinc, indium, silver, titanium (Ti), germanium, bismuth, antimony (Sb), and chromium (Cr). Examples of compounds of silicon include a compound containing oxygen (O) or carbon (C) as an element other than silicon. The compounds of silicon may have one or more of the elements described for the alloys of silicon as an element other than silicon. Examples of an alloy or a compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 < v \leq 2$), $SnO_w$ ($0 < w \leq 2$), and $LiSiO$.

A material containing tin (tin-containing material) may be a simple substance, an alloy, or a compound of tin; or a material having one or more phases thereof at least in part. Examples of alloys of tin include a material having one or more of the following elements as an element other than tin. Such an element other than tin is silicon, nickel, copper, iron, cobalt, manganese, zinc, indium, silver, titanium, germanium, bismuth, antimony, and chromium. Examples of compounds of tin include a compound containing oxygen (O) or carbon (C) as an element other than tin. The compounds of tin may have one or more of the elements described for the alloys of tin as an element other than tin. Examples of an alloy or a compound of tin include $SnSiO_3$, $LiSnO$, and $Mg_2Sn$.

In particular, for example, the tin-containing material preferably contains a second element and a third element in addition to tin as a first element, since thereby a high energy density is able to be stably obtained. The second element is, for example, one or more of the following elements. That is, the second element is one or more of cobalt, iron, magnesium, titanium, vanadium, chromium, manganese, nickel, copper, zinc, gallium, zirconium, niobium, molybdenum, silver, indium, cerium (Ce), hafnium, tantalum, tungsten, bismuth, and silicon. The third element is, for example, one or more of boron, carbon, aluminum, and phosphorus.

Other anode material is, for example, a carbon material, since crystal structure change at the time of insertion and extraction of the electrode reactant is extremely small, and high energy density is able to be obtained. In addition, the carbon material functions as an anode electrical conductor. Examples of carbon materials include graphitizable carbon, non-graphitizable carbon in which the spacing of (002) plane is 0.37 nm or more, and graphite in which the spacing of (002) plane is 0.34 nm or less. More specifically, examples of carbon materials include pyrolytic carbon, coke, glassy carbon fiber, an organic polymer compound fired body, activated carbon, and carbon black. The coke includes pitch coke, needle coke, and petroleum coke. The organic polymer compound fired body is obtained by firing and carbonizing a phenol resin, a furan resin or the like at appropriate temperature. The shape of the carbon material may be any of a fibrous shape, a spherical shape, a granular shape, and a scale-like shape.

In addition, examples of other anode materials include a metal oxide and a polymer compound. Examples of the metal oxide include iron oxide, ruthenium oxide, and molybdenum oxide. Examples of the polymer compound include polyacetylene, polyaniline, and polypyrrole.

It is needless to say that the anode material may be a material other than the foregoing. Further, two or more of the foregoing anode active materials may be used by mixture arbitrarily.

The anode active material layer 2 is formed by, for example, coating method, vapor-phase deposition method, liquid-phase deposition method, spraying method, firing method (sintering method), or a combination of two or more of these methods. Coating method is a method in which, for example, a particulate anode active material is mixed with an anode binder or the like, the mixture is dispersed in a solvent, and the anode current collector is coated with the resultant. Examples of vapor-phase deposition methods include physical deposition method and chemical deposition method. Specifically, examples thereof include vacuum evaporation method, sputtering method, ion plating method, laser ablation method, thermal CVD (Chemical Vapor Deposition) method, and plasma CVD method. Examples of liquid-phase deposition methods include electrolytic plating method and electroless plating method. Spraying method is a method in which the anode active material is sprayed in a fused state or a semi-fused state. Firing method is, for example, a method in which after the anode current collector is coated by a procedure similar to that of coating method, heat treatment is provided at a temperature higher than the melting point of the anode binder or the like. Examples of firing methods include a known technique such as atmosphere firing method, reactive firing method, and hot press firing method. Specially, the anode active material layer 2 is preferably formed by the vapor-phase deposition method since the anode active material layer 2 is bonded to the anode current collector 1, thereby increasing denseness of the anode active material layer 2.

Further, a method for forming the anode active material layer 2 includes, in addition to the foregoing methods, mechanical alloying method, a method in which raw material compounds are mixed and heat-treated in inert atmosphere, melt spinning method, gas atomization method, and water atomization method. Still further, in the case where lithium fluorosilicate is used as the anode material, it is possible to react hydrofluorosilicic acid (hexafluorosilicic acid: $H_2SiF_6$) with an alkaline solution containing lithium hydroxide (LiOH) or the like, and salt-out lithium fluorosilicate. Each material may be pulverized or unpulverized, and two or more materials may be combined.

Manufacturing Method of the Anode

The anode 10 is manufactured, for example, by the following procedure.

Specifically, first, the anode current collector 1 is prepared, and the surface of the anode current collector 1 is provided with roughening treatment according to needs. After that, the anode active material containing the foregoing anode material is deposited on the surface of the anode current collector 1 using the foregoing methods, such as vapor-phase deposition method, thereby the anode active material layer 2 is formed. If vapor-phase deposition method is used, the anode active material may be deposited while the anode current collector 1 is fixed, or the anode active material may be deposited while the anode current collector 1 is rotated. Thereby, the anode 10 is completed.

Action and Effect of this Embodiment

As described above, according to this embodiment, the anode active material layer 2 contains lithium fluorosilicate as the anode active material. Therefore, in the case where the anode 10 is used in a lithium ion secondary battery or the like, stress resulting from expansion and shrinkage at the time of charge and discharge in the anode active material layer 2 is relaxed. As a reason for expansion accompanying charge and discharge in the anode active material layer, increase in space between silicon atoms accompanying lithium inserted and excessive formation of a solid-liquid interface layer (SEI) coating in the periphery of the silicon atoms are considered. Since a more significant expansion occurs after charge and discharge cycles are repeatedly performed, compared to initial charge and discharge, it is presumed that the expansion attributed to the latter (expansion due to excessive formation of SEI coating) has a greater effect than expansion attributed to the former. In the lithium fluorosilicate used as the anode active material in this embodiment, since bonds surrounding silicon are all attached to fluorine or lithium, a new bond with a material that may become SEI coating, such as an organic matter or a carbonic acid root having a long chain length, is not formed. Therefore, since the SEI coating is not excessively formed, expansion of the anode active material layer 2 caused by repeated charge and discharge is inhibited, and stable insertion and extraction of lithium ions is continued. Therefore, structural breakage of the anode active material layer 2 is inhibited, and contact characteristics between the anode active material layer 2 and the anode current collector 1, and current collectivity are improved. As a result, in the case where the anode 10 is applied to the lithium ion secondary battery, superior cycle characteristics are able to be obtained while realizing high capacity. In addition, in the case where graphite is also included with $Li_2SiF_6$ as the anode active material, since increase in resistance accompanying the addition of an insulating binder is able to be suppressed, higher capacity and improvement of cycle characteristics are expected. Further, compared to a case where only $Li_2SiF_6$ is used as the anode active material, decrease in electric potential of the anode 10 at the time of charge is able to be relaxed, and thereby micro-short circuits become very rare occurrences.

Modification

Next, a modification of the anode 10 according to the foregoing first embodiment will be described.

The anode active material layer may contain a fluorine-containing compound having a negative charge or an unshared electron pair, and having a constant degree of polymerization or structural sterical hinder. Specifically, examples of such fluorine-containing compound include polyvinylidene fluoride (PVDF), tetrafluoroethylene-perfluoroalkoxyethylene copolymer (PFA), tetrafluoroethylene-hexafluoropropylene copolymer (PFA), and polytetrafluoroethylene (PTFE). In this case, the anode 10 is manufactured, for example, in the following manner. Specifically, an anode active material containing lithium fluorosilicate and the like and the foregoing fluorine-containing compound are mixed in a solution state and an anode mixture is prepared. The anode mixture is then dispersed in a solvent, such as N-methyl-2-pyrrolidone (NMP), and paste anode mixture slurry is obtained. Next, the anode current collector 1 is coated with the anode mixture slurry, and the solvent is dried. Then, the anode active material layer 2 is formed by compression molding by a rolling press machine or the like, thereby obtaining the anode 10.

In the modification, in the case where the anode active material layer 2 contains lithium fluorosilicate as the anode material and polyvinylidene fluoride as the fluorine-containing compound, the content of polyvinylidene fluoride is preferably 0.1 parts by weight to 10 parts by weight, both inclusive, when the content of lithium fluorsilicate is 100 parts by weight.

In addition, to manufacture the anode active material layer 2, the anode mixture slurry may be formed by the anode mixture in which the foregoing anode active material and the foregoing fluorine-containing compound are mixed being dispersed in a solution containing one or more of styrene-butadiene rubber, acrylic rubber, methyl methacrylate, carboxymethylcellulose, methylcellulose, and hydroxyopropyl methylcellulose instead of N-methyl-2-pyrrolidone.

In this way, in the modification, the anode active material layer 2 contains a given fluorine-containing compound. Therefore, in the case where the anode 10 is used in a lithium ion secondary battery or the like, decomposition reaction of the anode active material caused by acidic impurities, such as hydrogen fluoride (HF), within the electrolytic solution is able to be inhibited. Ordinarily, when the foregoing acidic impurity present in the electrolytic solution acts, for example, on the lithium atoms in $Li_2SiF_6$ having the octahedron structure, $SiF_4$ and HF are newly generated by the decomposition reaction thereof. Decomposition reaction such as this may cause various issues, such as decrease in discharge capacity of the battery, increase in internal resistance, and decrease in cycle life. Therefore, in the modification, as a result of the effect of the fluorine-containing compound included in the anode active material layer 2, reaction between the lithium atoms in lithium fluorosilicate and the acidic impurity is inhibited. Specifically, as a result of a state in which the lithium fluorosilicate and the fluorine-containing compound are dispersed in solvent such as N-methyl-2-pyrrolidone being obtained (anode mixture slurry being formed), $\delta+$ of the lithium atom in lithium fluorosilicate and $\delta-$ of the fluorine atom in the fluorine-containing compound are attracted, and reaction between the lithium atoms and the acidic impurity is interfered.

As described above, in the modification, further higher capacity and further improvement in cycle characteristics are able to be obtained by sufficiently inhibiting the decomposition reaction of the anode active material.

2. Second Embodiment

Next, a description will be given of usage examples of the anode 10 described in the foregoing first embodiment. A description will be given taking as an example a first secondary battery to a third secondary battery as a lithium ion secondary battery for which the anode 10 is used.

2-1. First Secondary Battery (Cylindrical Type)

Figure 2:
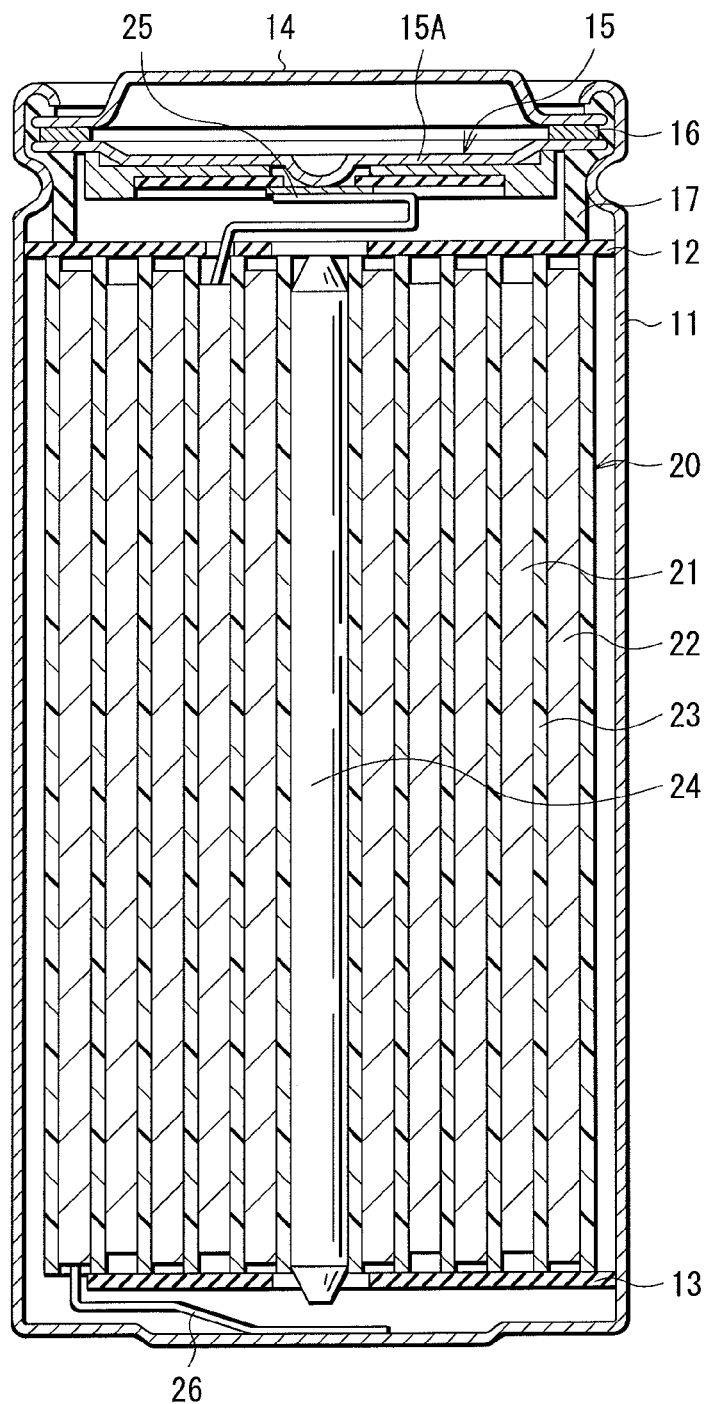
FIG. 2 is a cross sectional view illustrating a structure of a first secondary battery using the anode of the disclosure.
Figure 3:
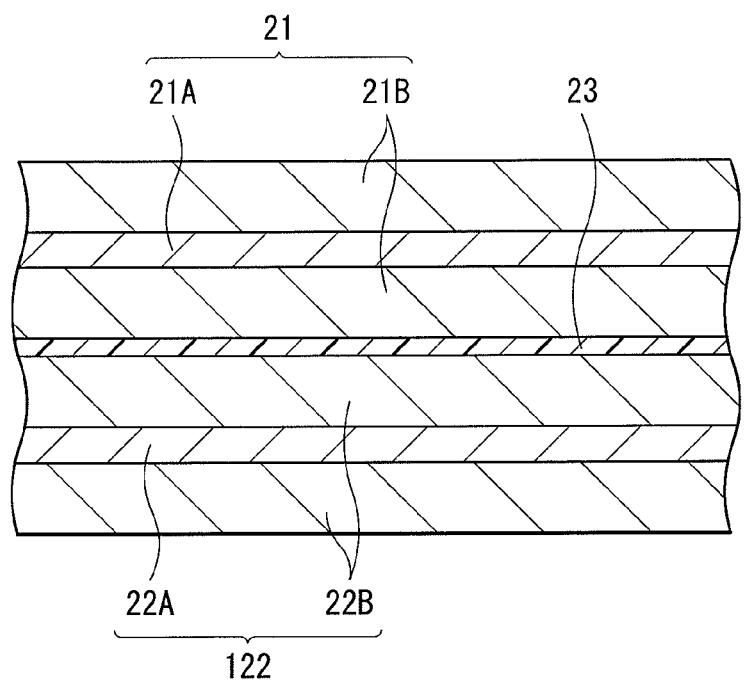
FIG. 3 is a cross sectional view illustrating an enlarged part of the spirally wound electrode body illustrated in FIG. 2.

FIG. 2 and FIG. 3 illustrate a cross sectional structure of a first secondary battery. FIG. 3 illustrates an enlarged part of a spirally wound electrode body 20 illustrated in FIG. 2. The secondary battery herein described is, for example, a lithium ion secondary battery in which, for example, a capacity of an anode 22 is expressed based on insertion and extraction of lithium.

Whole Structure of the First Secondary Battery

The secondary battery mainly contains the spirally wound electrode body 20 in which a cathode 21 and the anode 22 are layered with a separator 23 in between and spirally wound, and a pair of insulating plates 12 and 13 inside a battery can 11 in the shape of an approximately hollow cylinder. The battery structure including the battery can 11 is a so-called cylindrical type.

The battery can 11 is made of, for example, a metal material such as iron, aluminum, or an alloy thereof. One end of the battery can 11 is closed, and the other end of the battery can 11 is opened. The pair of insulating plates 12 and 13 is arranged to sandwich the spirally wound electrode body 20 in between and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. In the safety valve mechanism 15, in the case where the internal pressure becomes a certain level or more by internal short circuit, external heating or the like, a disk plate 15A flips to cut the electric connection between the battery cover 14 and the spirally wound electrode body 20. As temperature rises, the PTC device 16 increases the resistance and thereby limits a current to prevent abnormal heat generation resulting from a large current. The gasket 17 is made of, for example, an insulating material. The surface of the gasket 17 is coated with asphalt.

A center pin 24 may be inserted in the center of the spirally wound electrode body 20. In the spirally wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by being welded to the safety valve mechanism 15. The anode lead 26 is welded and thereby electrically connected to the battery can 11.

Cathode

The cathode 21 has a structure in which, for example, a cathode active material layer 21B is provided on both faces of a cathode current collector 21A having a pair of faces. The cathode current collector 21A is made of a metal material such as aluminum, nickel, and stainless steel. The cathode active material layer 21B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is able to be obtained. Examples of the lithium-containing compound include a composite oxide containing lithium and a transition metal element, and a phosphate compound containing lithium and a transition metal element. Specially, a compound containing at least one selected from the group consisting of cobalt, nickel, manganese, and iron as a transition metal element is preferable, since thereby a higher voltage is able to be obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state of the secondary battery, and are generally in the range of $0.05 \leq x \leq 1.10$ and $0.05 \leq y \leq 1.10$.

Examples of composite oxides containing lithium and a transition metal element include a lithium cobalt composite oxide ($Li_xCoO_2$), a lithium nickel composite oxide ($Li_xNiO_2$), a lithium nickel cobalt composite oxide ($Li_xNi_{(1-z)}Co_zO_2$ (z<1)), a lithium nickel cobalt manganese composite oxide ($Li_xNi_{(1-v-w)}Co_vMn_wO_2$) (v+w<1)), and a lithium manganese composite oxide having a spinel structure ($LiMn_2O_4$). Specially, a composite oxide containing cobalt is preferable, since thereby a high capacity is obtained and superior cycle characteristics are obtained. Further, examples of phosphate compounds containing lithium and a transition metal element include lithium iron phosphate compound ($LiFePO_4$) and a lithium iron manganese phosphate compound ($LiFe_{(1-u)}Mn_uPO_4$(u<1)).

In addition, examples of cathode materials include an oxide, a disulfide, a chalcogenide, and a conductive polymer. Examples of oxides include titanium oxide, vanadium oxide, and manganese dioxide. Examples of disulfides include titanium disulfide and molybdenum sulfide. Examples of chalcogenide include niobium selenide. Examples of conductive polymers include sulfur, polyaniline and polythiophene.

It is needless to say that the cathode material may be a material other than the foregoing compounds. Further, two or more of the foregoing cathode materials may be used by mixture arbitrarily.

Examples of cathode binders include a synthetic rubber such as styrene-butadiene rubber, fluorine system rubber, and ethylene propylenediene, and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. One thereof may be used singly, or a plurality thereof may be used by mixture. The cathode electrical conductor may be a metal material, a conductive polymer or the like as long as the material has electric conductivity.

Anode

The anode 22 has a structure similar to that of the foregoing anode 10. For example, in the anode 22, an anode active material layer 22B is provided on both faces of an anode current collector 22A having a pair of faces. The structures of the anode current collector 22A and the anode active material layer 22B are respectively similar to the structures of the anode current collector 1 and the anode active material layer 2 in the foregoing anode. In the anode 22, the chargeable capacity of the anode material capable of inserting and extracting lithium is preferably larger than the chargeable capacity of the cathode 21. Thereby, at the time of full charge, there is low possibility that lithium is precipitated as dendrite on the anode 22.

Separator

The separator 23 separates the cathode 21 from the anode 22, and passes lithium ions while preventing current short circuit due to contact of both electrodes. The separator 23 is made of, for example, a porous film composed of a synthetic resin such as polytetrafluoroethylene, polypropylene, and polyethylene, or a ceramics porous film. The separator 23 may have a structure in which two or more porous films are layered. Specially, a porous film made of polyolefin is preferable, since such a film has superior short circuit preventive effect, and is able to achieve safety improvement of the secondary battery by shutdown effect. In particular, polyethylene is preferable since shutdown effect is able to be thereby obtained at from 100 deg C. to 160 deg C. both inclusive and its electrochemical stability is excellent. Further, polypropylene is also preferable. In addition, a copolymer of polyethylene and polypropylene or a blended material thereof may be used as long as such a resin has chemical stability.

Electrolytic Solution

An electrolytic solution as a liquid electrolyte impregnates the separator 23. The electrolytic solution contains a solvent and an electrolyte salt dissolved therein.

The solvent contains, for example, one or more nonaqueous solvents such as an organic solvent. The solvents (nonaqueous solvents) described below may be used singly or two or more thereof may be used by mixture.

Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. By using such a nonaqueous solvent, a superior battery capacity, superior cycle characteristics, superior storage characteristics and the like are obtained.

Specially, at least one of ethylene carbonate, propylene carbonate, dimethyl carbonate, diethyl carbonate, and ethyl methyl carbonate is preferable. By using such a nonaqueous solvent, a superior battery capacity, superior cycle characteristics, superior storage characteristics and the like are obtained. In this case, a mixture of a high viscosity (high dielectric constant) solvent (for example, specific inductive ∈≥30) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation characteristics of the electrolyte salt and ion mobility are improved.

In particular, the solvent preferably contains at least one of a halogenated chain ester carbonate and a halogenated cyclic ester carbonate. Thereby, a stable protective film is formed on the surface of the anode 22 at the time of charge and discharge, and thus decomposition reaction of the electrolytic solution is inhibited. The halogenated chain ester carbonate is a chain ester carbonate having halogen as an element. More specifically, at least some of hydrogen in the chain ester carbonate are substituted with halogen. Further, the halogenated cyclic ester carbonate is a cyclic ester carbonate containing halogen as an element. More specifically, at least some of hydrogen in the cyclic ester carbonate are substituted with halogen.

The halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and more stable protective film is formed. Accordingly, decomposition reaction of the electrolytic solution is more inhibited.

Examples of the halogenated chain ester carbonate include fluoromethyl methyl carbonate, bis(fluoromethyl) carbonate, and difluoromethyl methyl carbonate. Examples of the halogenated cyclic ester carbonate include 4-fluoro-1,3-dioxolane-2-one and 4,5-difluoro-1,3-dioxolane-2-one. Halogenated cyclic ester carbonate includes a geometric isomer as well. Contents of the halogenated chain ester carbonate and the halogenated cyclic ester carbonate in the solvent is, for example, from 0.01 wt % to 50 wt % both inclusive.

Further, the solvent preferably contains an unsaturated carbon bond cyclic ester carbonate. Thereby, a stable protective film is formed on the surface of the anode 22 at the time of charge and discharge, and thus decomposition reaction of the electrolytic solution is inhibited. The unsaturated carbon bond cyclic ester carbonate is a cyclic ester carbonate having an unsaturated carbon bond. More specifically, unsaturated carbon bond is introduced to a given location of the cyclic ester carbonate. Examples of the unsaturated carbon bond cyclic ester carbonate include vinylene carbonate and vinylethylene carbonate. Contents of the unsaturated carbon bond cyclic ester carbonate in the solvent is, for example, from 0.01 wt % to 10 wt % both inclusive.

Further, the solvent preferably contains sultone (cyclic sulfonic ester), since thereby chemical stability of the electrolytic solution is improved. Examples of the sultone include propane sultone and propene sultone. The sultone content in the solvent is, for example, from 0.5 wt % to 5 wt % both inclusive.

Further, the solvent preferably contains an acid anhydride since chemical stability of the electrolytic solution is thereby improved. Examples of acid anhydrides include carboxylic anhydride, disulfonic anhydride, and carboxylic sulfonic anhydride. Examples of carboxylic anhydrides include succinic anhydride, glutaric anhydride, and maleic anhydride. Examples of disulfonic anhydrides include ethane disulfonic anhydride and propane disulfonic anhydride. Examples of carboxylic sulfonic anhydrides include sulfobenzoic anhydride, sulfopropionic anhydride, and sulfobutyric anhydride. The content of the acid anhydride in the solvent is, for example, from 0.5 wt % to 5 wt % both inclusive.

The electrolyte salt contains, for example, one or more light metal salts such as a lithium salt. The electrolyte salts described below may be used singly or two or more thereof may be used by mixture.

Examples of lithium salts include the following. That is, examples thereof include lithium hexafluorophosphate ($LiPF_6$), lithium tetrafluoroborate ($LiBF_4$), lithium perchlorate ($LiClO_4$), and lithium hexafluoroarsenate ($LiAsF_6$). Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride ($LiCl$), and lithium bromide ($LiBr$). In the case of using the foregoing material, superior battery capacity, superior cycle characteristics, superior storage characteristics and the like are obtained.

Specially, at least one of lithium hexafluorophosphate, lithium tetrafluoroborate, lithium perchlorate, and lithium hexafluoroarsenate is preferable. Further, lithium hexafluorophosphate and lithium tetrafluoroborate are more preferable, and lithium hexafluorophosphate is most preferable, since the internal resistance is thereby lowered, more superior effect is obtained.

The content of the electrolyte salt to the solvent is preferably from 0.3 mol/kg to 3.0 mol/kg both inclusive, since thereby high ion conductivity is obtained.

The electrolytic solution may contain various additives together with the solvent and the electrolyte salt, since thereby chemical stability of the electrolytic solution is more improved.

Examples of additives include sultone (cyclic ester sulfonate). Examples of sultone include propane sultone and propene sultone. Specially, propene sultone is preferable. Such sultone may be used singly, or a plurality thereof may be used by mixture.

Examples of additives include an acid anhydride. Examples of acid anhydrides include carboxylic anhydride such as succinic anhydride, glutaric anhydride, and maleic anhydride; disulfonic anhydride such as ethane disulfonic anhydride and propane disulfonic anhydride; and an anhydride of carboxylic acid and sulfonic acid such as sulfobenzoic anhydride, sulfopropionic anhydride, and sulfobutyric anhydride. Specially, sulfobenzoic anhydride or sulfopropionic anhydride is preferable. The anhydrides may be used singly, or a plurality thereof may be used by mixture.

Manufacturing Method of the Secondary Battery

The secondary battery is manufactured, for example, by the following procedure.

First, the cathode 21 is formed. First, a cathode active material, and if necessary, a cathode binder, a cathode electrical conductor or the like are mixed to prepare a cathode mixture, which is dispersed in an organic solvent to form paste cathode mixture slurry. Subsequently, both faces of the cathode current collector 21A are uniformly coated with the cathode mixture slurry, which is dried to form the cathode active material layer 21B. Finally, the cathode active material layer 21B is compression-molded by using a rolling press machine or the like while being heated if necessary. In this case, the resultant may be compression-molded over several times.

Next, the anode 22 is formed by a procedure similar to that of the foregoing anode 10 or the like. In this case, after the anode current collector 22A is prepared, the anode active material layer 22B is formed by sequentially forming a first region, an oxygen-containing region, and a second region on both faces of the anode current collector 22A.

Finally, the secondary battery is assembled by using the cathode 21 and the anode 22. First, the cathode lead 25 is attached to the cathode current collector 21 by welding or the like, and the anode lead 26 is attached to the anode current collector 22A by welding or the like. Subsequently, the cathode 21 and the anode 22 are layered with the separator 23 in between and spirally wound, and thereby the spirally wound electrode body 20 is formed. After that, the center pin 24 is inserted in the center of the spirally wound electrode body. Subsequently, the spirally wound electrode body 20 is sandwiched between the pair of insulating plates 12 and 13, and contained in the battery can 11. In this case, the cathode lead 25 is attached to the safety valve mechanism 15 by welding or the like, and the anode lead 26 is attached to the battery can 11 by welding or the like. Subsequently, the electrolytic solution is injected into the battery can 11 and impregnates the separator 23. Finally, after the battery cover 14, the safety valve mechanism 15, and the PTC device 16 are attached to the open end of the battery can 11, the resultant is caulked with the gasket 17. Thereby, the secondary battery illustrated in FIG. 2 and FIG. 3 is completed.

The anode active material composing the anode active material layer 22 may be electrochemically doped with lithium inside the battery after the battery is formed, may be electrochemically doped by being supplied lithium from the cathode or a lithium source other than the cathode before or after the battery is formed, or the anode active material may be synthesized as a lithium-containing compound during material synthesis and lithium may be contained in the anode at the time the battery is formed.

Operation of the Secondary Battery

In the secondary battery, when charged, for example, lithium ions are extracted from the cathode 21 and inserted in the anode 22 through the electrolytic solution impregnating the separator 23. Meanwhile, when discharged, for example, lithium ions are extracted from the anode 22, and inserted in the cathode 21 through the electrolytic solution impregnating the separator 23.

Effect of the Secondary Battery

According to the first secondary battery, the anode 22 has the structure similar to that of the anode 10 illustrated in FIG. 1. Thus, the cycle characteristics are able to be improved while a high capacity is obtained. Effects of the first secondary battery other than the foregoing effects are similar to those of the foregoing anode 10.

2-2. Second Secondary Battery (Laminated Film Type)

Figure 4:
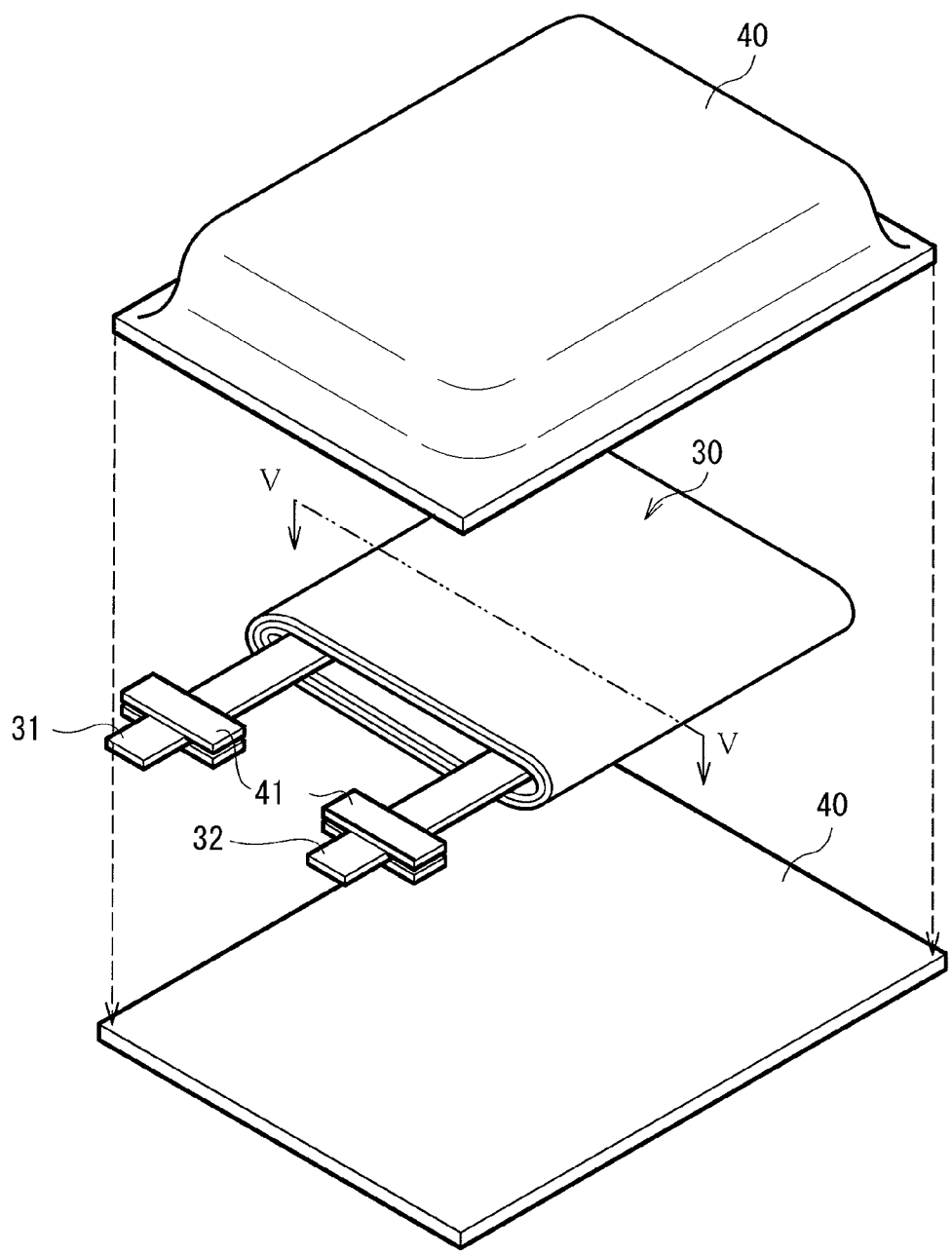
FIG. 4 is an exploded perspective view illustrating a structure of a second secondary battery using the anode of the disclosure.
Figure 5:
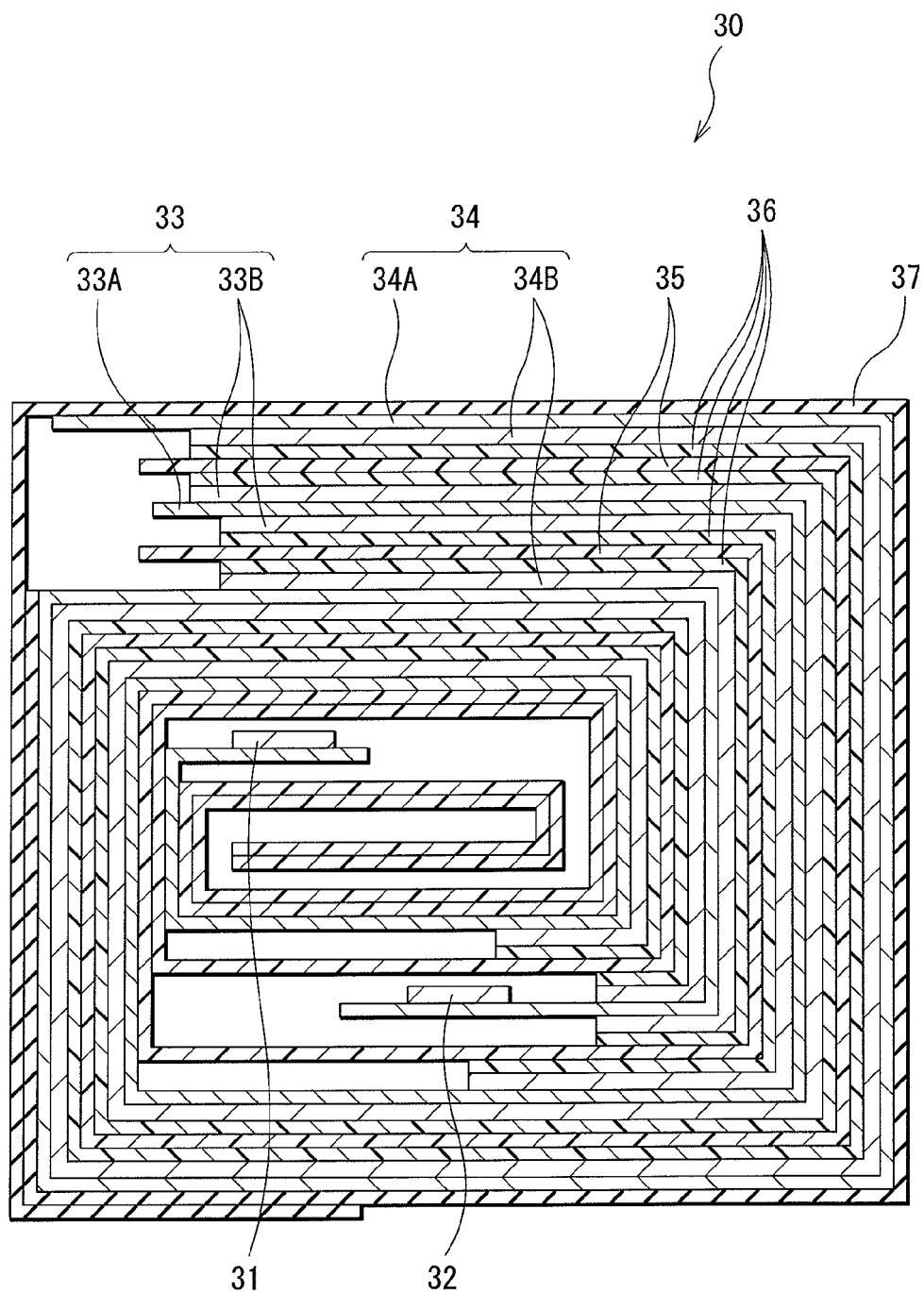
FIG. 5 is a cross sectional view illustrating a structure taken along line V-V of the spirally wound electrode body illustrated in FIG. 4.

FIG. 4 illustrates an exploded perspective structure of a second secondary battery. FIG. 5 illustrates an enlarged cross section taken along line V-V of a spirally wound electrode body 30 illustrated in FIG. 4.

The secondary battery is, for example, a lithium ion secondary battery as the first secondary battery. In the second secondary battery, a spirally wound electrode body 30 on which a cathode lead 31 and an anode lead 32 are attached is contained in a film package member 40. The battery structure using the package member 40 is so-called laminated film type.

The cathode lead 31 and the anode lead 32 are respectively directed from inside to outside of the package member 40 in the same direction, for example. However, positions of the cathode lead 31 and the anode lead 32 to the spirally wound electrode body 30, the derivation direction thereof and the like are not particularly limited. The cathode lead 31 is made of, for example, aluminum or the like, and the anode lead 32 is made of, for example, copper, nickel, stainless steel or the like. These materials are in the shape of a thin plate or mesh.

The package member 40 is a laminated film in which, for example, a fusion bonding layer, a metal layer, and a surface protective layer are layered in this order. In this case, for example, the respective outer edges in the fusion bonding layer of two films are bonded to each other by fusion bonding, an adhesive or the like so that the fusion bonding layer and the spirally wound electrode body 30 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 40, an aluminum laminated film in which a polyethylene film, an aluminum foil, and a nylon film are layered in this order is preferable. However, the package member 40 may be made of a laminated film having other laminated structure, a polymer film such as polypropylene, or a metal film instead of the foregoing aluminum laminated film.

An adhesive film 41 to protect from entering of outside air is inserted between the package member 40 and the cathode lead 31, the anode lead 32. The adhesive film 41 is made of a material having contact characteristics with respect to the cathode lead 31 and the anode lead 32. Examples of such a material include, for example, a polyolefin resin such as polyethylene, polypropylene, modified polyethylene, and modified polypropylene.

In the spirally wound electrode body 30, as illustrated in FIG. 5 a cathode 33 and an anode 34 are layered with a separator 35 and an electrolyte layer 36 in between and spirally wound. The outermost periphery thereof is protected by a protective tape 37. The cathode 33 has a structure in which, for example, a cathode active material layer 33B is provided on both faces of a cathode current collector 33A. The anode 34 has a structure in which, for example, an anode active material layer 34B is provided on both faces of an anode current collector 34A.

Figure 6:
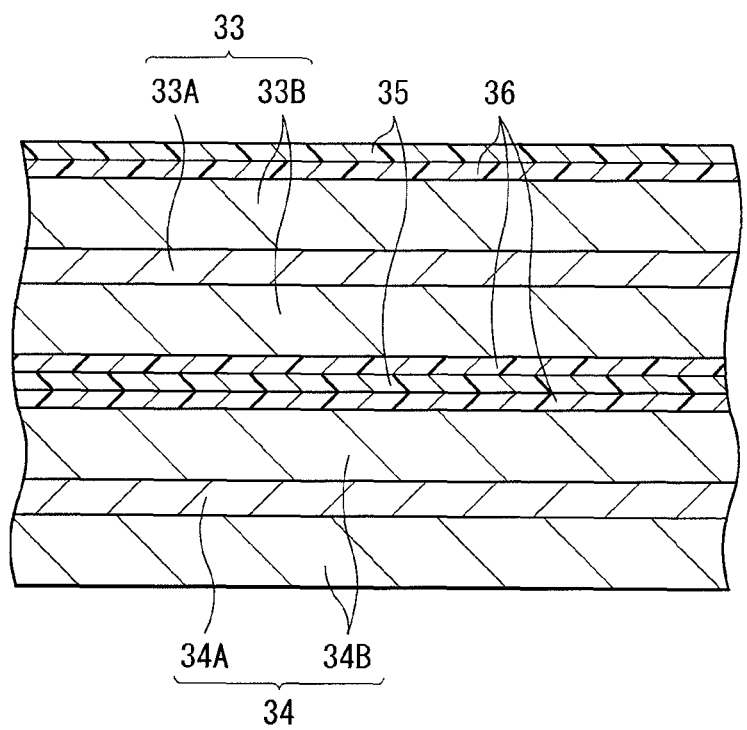
FIG. 6 is a cross sectional view illustrating an enlarged part of the spirally wound electrode body illustrated in FIG. 5.

FIG. 6 illustrates an enlarged part of the spirally wound electrode body 30 illustrated in FIG. 5. The cathode 33 has a structure in which, for example, the cathode active material layer 33B is provided on both faces of the cathode current collector 33A having a pair of faces. The anode 34 has a structure similar to that of the foregoing anode in which, for example, the anode active material layer 34B is provided on both faces of the anode current collector 34A having a pair of faces. The structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the foregoing first secondary battery.

In the electrolyte layer 36, an electrolytic solution is held by a polymer compound. The electrolyte layer 36 may contain other material such as various additives according to needs. The electrolyte layer 36 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include one or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further, examples thereof include a copolymer of vinylidene fluoride and hexafluoropropylene. Such a compound may be used singly, or a plurality thereof may be used by mixture. Specially, polyvinylidene fluoride or the copolymer of vinylidene fluoride and hexafluoropropylene is preferable, since such a polymer compound is electrochemically stable.

The composition of the electrolytic solution is similar to the composition of the electrolytic solution in the first secondary battery. However, in the electrolyte layer 36 as the gel electrolyte, a solvent of the electrolytic solution means a wide concept including not only the liquid solvent but also a material having ion conductivity capable of dissociating the electrolyte salt. Therefore, in the case where the polymer compound having ion conductivity is used, the polymer compound is also included in the solvent.

Instead of the gel electrolyte layer 36 in which an electrolytic solution is held by the polymer compound, the electrolytic solution may be directly used. In this case, the electrolytic solution impregnates the separator 35.

The secondary battery including the gel electrolyte layer 36 is manufactured, for example, by the following three procedures.

In the first manufacturing method, first, the cathode 33 and the anode 34 are formed by procedures similar to those of the cathode 21 and the anode 22 in the first secondary battery. Specifically, the cathode 33 is formed by forming the cathode active material layer 33B on both faces of the cathode current collector 33A, and the anode 34 is formed by forming the anode active material layer 34B on both faces of the anode current collector 34A. Subsequently, a precursor solution containing an electrolytic solution, a polymer compound, and a solvent is prepared. After the cathode 33 and the anode 34 are coated with the precursor solution, the solvent is volatilized to form the gel electrolyte layer 36. Subsequently, the cathode lead 31 is attached to the cathode current collector 33A by welding or the like, and the anode lead 32 is attached to the anode current collector 34A by welding or the like. Subsequently, the cathode 33 and the anode 34 provided with the electrolyte layer 36 are layered with the separator 35 in between and spirally wound. After that, the protective tape 37 is adhered to the outermost periphery thereof to form the spirally wound electrode body 30. Finally, after the spirally wound electrode body 30 is sandwiched between two pieces of the film package members 40, outer edges of the package members 40 are bonded by thermal fusion bonding or the like to enclose the spirally wound electrode body 30. At this time, the adhesive films 41 are inserted between the cathode lead 31, the anode lead 32 and the package member 40. Thereby, the secondary battery illustrated in FIG. 4 to FIG. 6 is completed.

In the second manufacturing method, first, the cathode lead 31 is attached to the cathode 33, and the anode lead 32 is attached to the anode 34. Subsequently, the cathode 33 and the anode 34 are layered with the separator 35 in between and spirally wound. After that, the protective tape 37 is adhered to the outermost periphery thereof, and thereby a spirally wound body as a precursor of the spirally wound electrode body 30 is formed. Subsequently, after the spirally wound body is sandwiched between two pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte layer 36 is formed. Accordingly, the secondary battery is completed.

In the third manufacturing method, the spirally wound body is formed and contained in the pouch-like package member 40 in the same manner as that of the foregoing second manufacturing method, except that the separator 35 with both faces coated with a polymer compound is used firstly. Examples of polymer compounds with which the separator 35 is coated include a polymer containing vinylidene fluoride as a component (a homopolymer, a copolymer, a multicomponent copolymer or the like). Specific examples include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution impregnates the polymer compound, and the polymer compound is gelated to form the electrolyte layer 36. Accordingly, the secondary battery is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte layer 36 compared to the second manufacturing method. Thus, the formation of the polymer compound is favorably controlled. Therefore, sufficient contact characteristics are obtained between the cathode 33/the anode 34/the separator 35 and the electrolyte layer 36.

In the secondary battery, at the time of charge, for example, lithium ions are extracted from the cathode 33, and are inserted in the anode 34 through the electrolyte layer 36. Meanwhile, at the time of discharge, for example, lithium ions are extracted from the anode 34, and are inserted in the cathode 33 through the electrolyte layer 36.

According to the second secondary battery, the anode 34 has the structure similar to that of the anode 10 illustrated in FIG. 1. Thus, the cycle characteristics are able to be improved while a high capacity is obtained. Other effect of the second secondary battery is similar to that of the foregoing anode 10.

2-3. Third Secondary Battery (Square Type)

Figure 7:
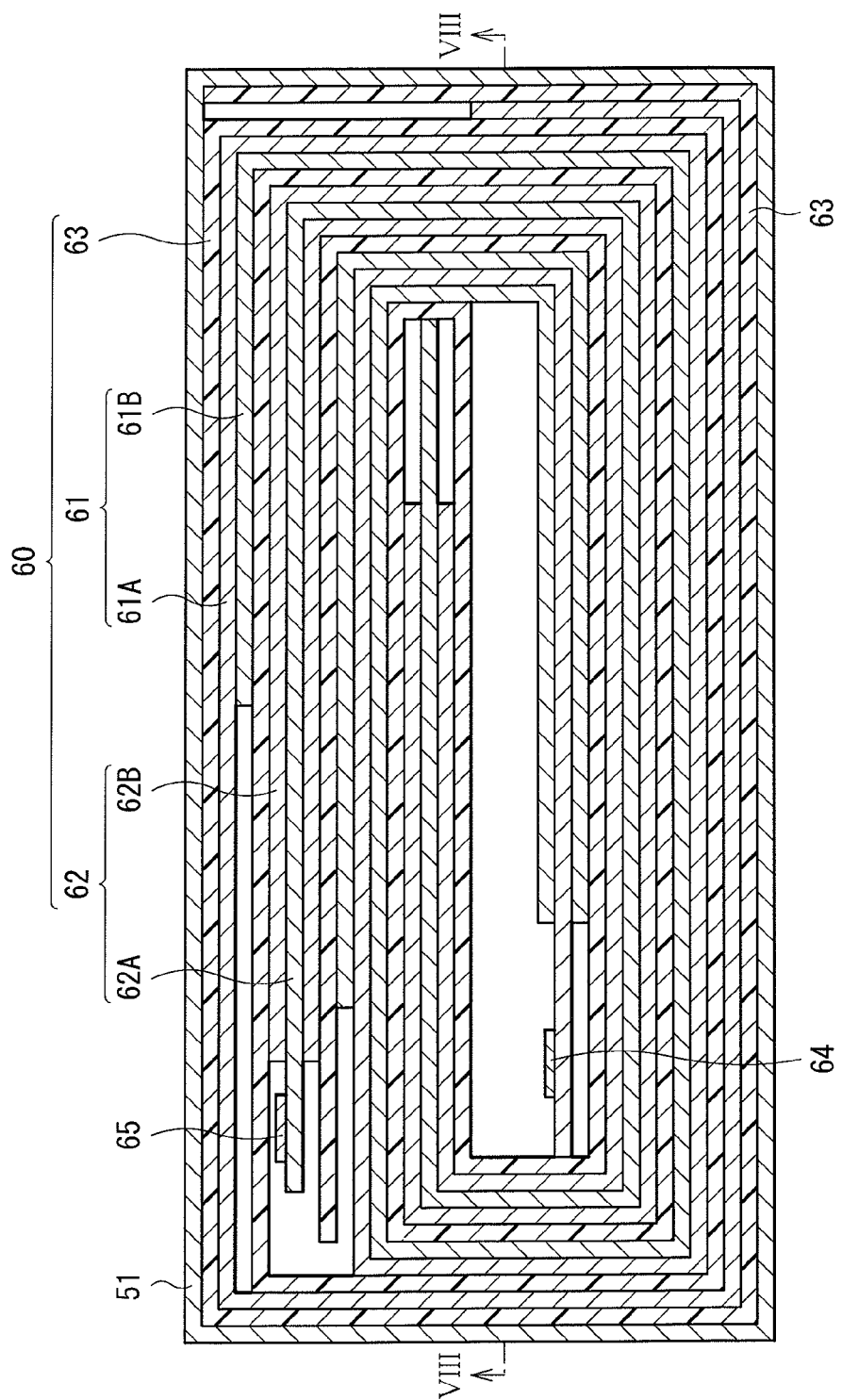
FIG. 7 is a cross sectional view illustrating a structure of a third secondary battery using the anode for a lithium ion secondary battery of the disclosure.
Figure 8:
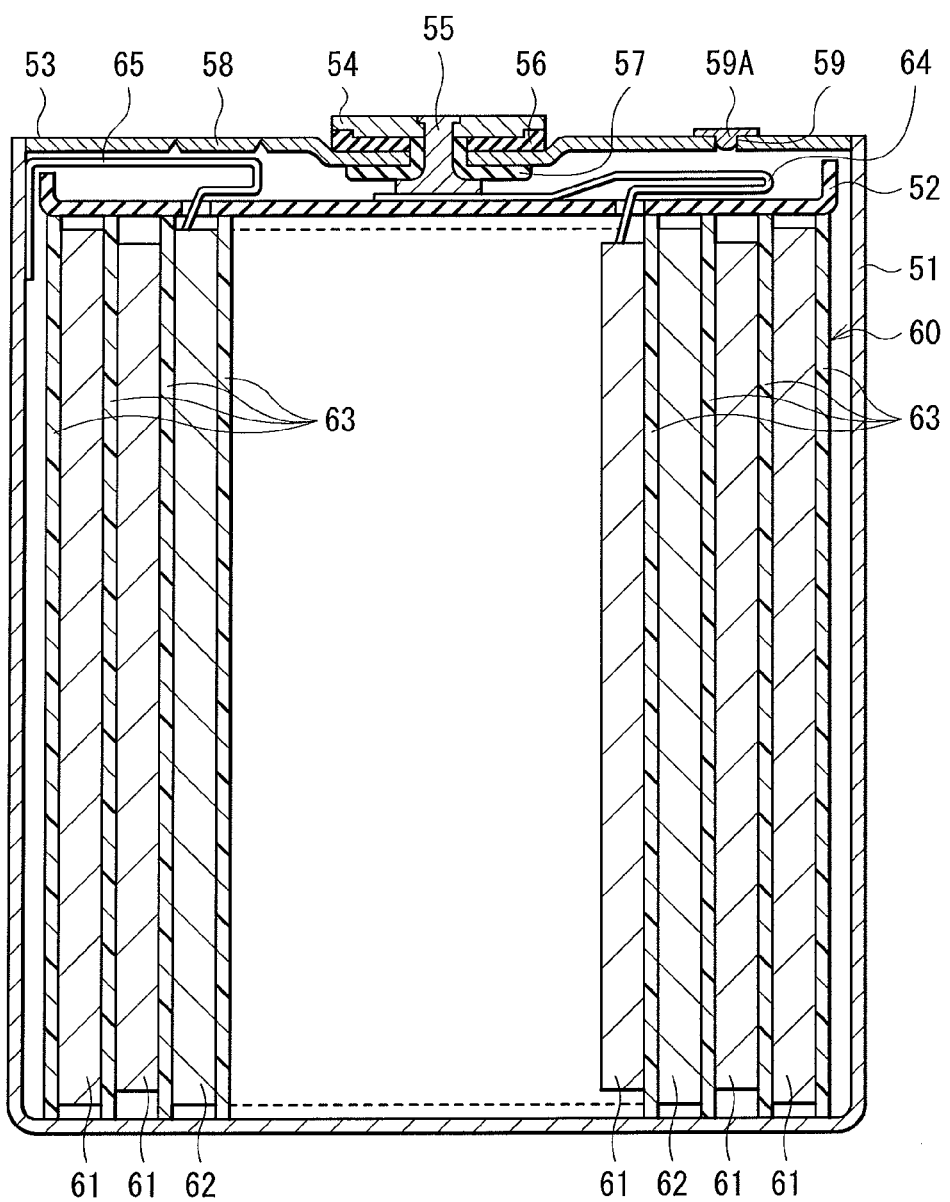
FIG. 8 is a cross sectional view illustrating a structure taken along line VIII-VIII of the spirally wound electrode body illustrated in FIG. 7.

FIG. 7 and FIG. 8 illustrate a cross sectional structure of a third secondary battery. The cross section illustrated in FIG. 7 and the cross section illustrated in FIG. 8 are orthogonal to each other as the positional relation. That is, FIG. 8 is a cross sectional view taken along line VIII-VIII illustrated in FIG. 7. The secondary battery is a so-called square type battery and is a lithium ion secondary battery in which a flat spirally wound electrode body 60 is contained in a package can 51 in the shape of an approximate hollow rectangular solid.

The package can 51 is made of, for example, iron (Fe) plated by nickel (Ni). The package can 51 also has a function as an anode terminal. One end of the package can 51 is closed and the other end of the package can 51 is opened. At the open end of the package can 51, an insulating plate 52 and a battery cover 53 are attached, and thereby inside of the battery can 51 is hermetically closed. The insulating plate 52 is made of, for example, polypropylene or the like, and is arranged perpendicular to the spirally wound circumferential face on the spirally wound electrode body 60. The battery cover 53 is, for example, made of a material similar to that of the battery can 51, and also has a function as an anode terminal together with the package can 51. Outside of the battery cover 53, a terminal plate 54 as a cathode terminal is arranged. In the approximate center of the battery cover 53, a through-hole is provided. A cathode pin 55 electrically connected to the terminal plate 54 is inserted in the through-hole. The terminal plate 54 is electrically insulated from the battery cover 53 with an insulating case 56 in between. The cathode pin 55 is electrically insulated from the battery cover 53 with a gasket 57 in between. The insulating case 56 is made of, for example, polybutylene terephthalate or the like. The gasket 57 is made of, for example, an insulating material, and the surface thereof is coated with asphalt.

In the vicinity of the rim of the battery cover 53, a cleavage valve 58 and an electrolytic solution injection hole 59 are provided. The cleavage valve 58 is electrically connected to the battery cover 53. When the internal pressure of the battery becomes a certain level or more by internal short circuit, external heating or the like, the cleavage valve 58 is cleaved to suppress an increase in internal pressure. The electrolytic solution injection hole 59 is sealed by a sealing member 59A made of, for example, a stainless steel ball.

In the spirally wound electrode body 60, a cathode 61 and an anode 62 are layered with a separator 63 in between, and are spirally wound. The spirally wound electrode body 60 is shaped flat according to the shape of the package can 51. The separator 63 is located at the outermost circumference of the spirally wound electrode body 60, and the cathode 61 is located just inside thereof. FIG. 8 is a simplified view of the laminated structure of the cathode 61 and the anode 62. The spirally winding number of the spirally wound electrode body 60 is not limited to the number illustrated in FIG. 7 and FIG. 8, but is able to be arbitrarily set. A cathode lead 64 made of aluminum (Al) or the like is connected to the cathode 61 of the spirally wound electrode body 60. An anode lead 65 made of nickel or the like is connected to the anode 62. The cathode lead 64 is electrically connected to the terminal plate 54 by being welded to the lower end of the cathode pin 55. The anode lead 65 is welded and electrically connected to the package can 51.

As illustrated in FIG. 7, in the cathode 61, a cathode active material layer 61B is provided on a single face or both faces of a cathode current collector 61A. In the anode 62, an anode active material layer 62B is provided on a single face or both faces of an anode current collector 62A. Structures of the cathode current collector 61A, the cathode active material layer 61B, the anode current collector 62A, the anode active material layer 62B, and the separator 63 are respectively similar to the structures of the cathode current collector 21A, the cathode active material layer 21B, the anode current collector 22A, the anode active material layer 22B, and the separator 23 in the first secondary battery described above. An electrolytic solution similar to that of the separator 23 impregnates the separator 63.

The third secondary battery is able to be manufactured, for example, as follows.

As in the foregoing first secondary battery, the cathode 61 and the anode 62 are layered with the separator 63 in between and spirally wound, and thereby the spirally wound electrode body 60 is formed. After that, the spirally wound electrode body 60 is contained in the package can 51. Next, the insulating plate 52 is arranged on the spirally wound electrode body 60. The anode lead 65 is welded to the battery can 51, the cathode lead 64 is welded to the lower end of the cathode pin 55, and the battery cover 53 is fixed on the open end of the battery can 51 by laser welding. Finally, the electrolytic solution is injected into the package can 51 through the electrolytic solution injection hole 59, and impregnates the separator 63. After that, the electrolytic solution injection hole 59 is sealed by the sealing member 59A. The secondary battery illustrated in FIG. 7 and FIG. 8 is thereby completed.

According to the third secondary battery, the anode 62 has the structure similar to that of the anode 10 illustrated in FIG. 1 described above. Thus, the cycle characteristics are able to be improved while a high capacity is obtained. Other effect of the third secondary battery is similar to that of the foregoing anode 10.

3. Application of a Lithium Ion Secondary Battery

Next, a description will be given of an application example of the foregoing lithium ion secondary battery.

Applications of the lithium ion secondary battery is not particularly limited as long as the lithium ion secondary battery is applied to a machine, a device, an instrument, an equipment, a system (collective entity of a plurality of devices and the like) or the like that is able to use the lithium ion secondary battery as a drive power source, an electric power storage source for electric power storage or the like. In the case where the lithium ion secondary battery is used as a power source, the lithium ion secondary battery may be used as a main power source (power source used preferentially), or an auxiliary power source (power source used instead of a main power source or used being switched from the main power source). The main power source type is not limited to the lithium ion secondary battery.

Examples of applications of the lithium ion secondary battery include portable electronic devices such as a video camera, a digital still camera, a mobile phone, a notebook personal computer, a cordless phone, a headphone stereo, a portable radio, a portable television, and a Personal Digital Assistant (PDA); a portable lifestyle device such as an electric shaver; a storage equipment such as a backup power source and a memory card; an electric power tool such as an electric drill and an electric saw; a medical electronic device such as a pacemaker and a hearing aid; a vehicle such as an electrical vehicle (including a hybrid car); and an electric power storage system such as a home battery system for storing electric power for emergency or the like. It is needless to say that application other than the foregoing applications may be adopted.

Specially, the lithium ion secondary battery is effectively applied to the electric power tool, the electrical vehicle, the electric power storage system or the like. In these applications, since superior battery characteristics (cycle characteristics, storage characteristics, and load characteristics and the like) are demanded, the characteristics are able to be effectively improved by using the lithium ion secondary battery of the disclosure. The electric power tool is a tool in which a moving part (for example, a drill or the like) is moved by using the lithium ion secondary battery as a driving power source. The electrical vehicle is a vehicle that acts (runs) by using the lithium ion secondary battery as a driving power source. As described above, a vehicle including the drive source as well other than the lithium ion secondary battery (hybrid car or the like) may be adopted. The electric power storage system is a system using the lithium ion secondary battery as an electric power storage source. For example, in a home electric power storage system, electric power is stored in the lithium ion secondary battery as an electric power storage source, and the electric power is consumed according to needs. In the result, various devices such as home electric products become usable. E

EXAMPLES

Specific examples of the disclosure will be described in detail.

Example 1-1

First, an equal amount of lithium hydroxide (LiOH) was reacted in an aqueous solution containing 50% hydrofluorosilicic acid ($H_2SiF_6$), and lithium fluorsilicate ($Li_2SiF_6$) as neutralized salt was filtered and dried. Then, the obtained lithium fluorosilicate was finely pulverized to obtain powder with a particle size distribution of $D_{50}$=10 μm.

Next, 1000 g of the lithium fluorosilicate obtained above and 10 g of vapor-grown carbon (VGCF) was dry-blended. The VGCF is fibrous carbon with a length of several tens of μm, and is added for mainly reducing resistance in the active material layer. The mixture was mixed with 200 g of N-methyl-2-pyrrolidone to which 20 g of polyvinylidene fluoride has been added, and stirred for 15 min at a low speed (5 rpm). Next, 150 g of NMP in which 15 g of hydroxypropyl methylcellulose as a thickening agent and a binder has been dissolved was injected, and stirred for 10 min at a low speed, and then further stirred for 20 min at a high speed (15 rpm). After that, 15 g of polyvinylidene fluoride powder was injected and stirred for 15 min at a low speed to obtain paste mixture slurry. Stirring was performed using a planetary mixer. A current collector made of a copper foil with a thickness of 10 μm was uniformly coated with the mixture slurry by a die-coating intermittent coating method, and the mixture slurry was dried. After that, the resultant was compression-molded at 120 deg C. to obtain a volume density of 1.8 g/cm³ to form the active material layer, thereby obtaining an electrode. Drying was performed by applying hot air of a temperature of 80 deg C. to 110 deg C., both inclusive, using a spray dryer. Further, the electrode obtained as described above was heat-treated at a temperature of 160 deg C. to 190 deg C., both inclusive, in a non-oxidizing nitrogen gas or inert gas atmosphere, and carbonization of the thickening agent, removal of crystal water, and active material surface coating by thermal decomposition of polyvinylidene fluoride were performed. As a result of heat treatment being performed at 160 deg C. to 190 deg C., both inclusive, removal of crystal water, carbonization of the thickening agent, and surface coating of the active material by polyvinylidene fluoride were favorably performed, without causing deformation of the electrode shape due to hardening of polyvinylidene fluoride.

Figure 9:
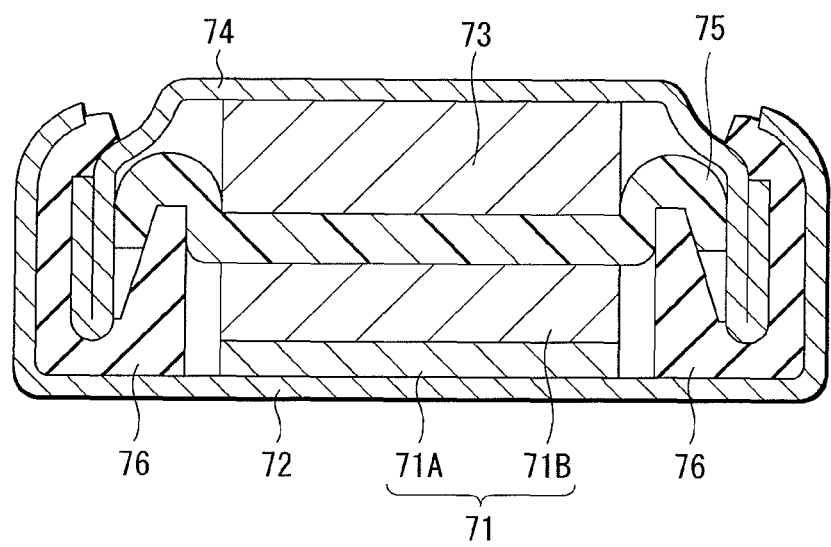
FIG. 9 is a cross sectional view illustrating a structure of a test cell used in an example of the disclosure.

Next, using the electrode, a coin-type test cell (diameter of 20 mm and thickness of 1.6 mm) having a structure illustrated in FIG. 9 was prepared. The test cell uses the foregoing electrode punched to form a pellet with a diameter of 16 mm as a test electrode 71. The test electrode 71 was contained in a package can 72, and a counter electrode 73 was bonded to a package cup 74. Then, the test electrode 71 and the counter electrode 73 were layered with a separator 75 impregnated with an electrolytic solution therebetween, and caulked with a gasket 76. That is, in the test electrode 71, an active material layer 71B made by the surface of an active material composed of lithium fluorosilicate and vapor-grown carbon being coated by polyvinylidene fluoride is provided on a current collector 71A composed of a copper foil. The active material layer 71B is arranged to oppose the counter electrode 73 with the separator 75 therebetween. Here, a lithium metal was used as the counter electrode 73 and a porous film made of polyethylene was used as the separator 75. As the electrolytic solution, an electrolytic solution obtained by dissolving $LiPF_6$ as an electrolyte salt into a mixed solvent of ethylene carbonate (EC), diethyl carbonate (DEC), propylene carbonate (PC), and vinyl ethylene carbonate (VEC) mixed at a mass ratio of 50:30:17:3. Here, the content of $LiPF_6$ to the mixed solvent was 1.0 mol/kg.

Example 1-2

A test cell (FIG. 9) of Example 1-2 was fabricated in the same manner as that of Example 1-1, except that silicon difluoride ($SiF_2$) was used instead of lithium fluorosilicate as the active material.

Example 1-3

A test cell (FIG. 9) of Example 1-3 was fabricated in the same manner as that of Example 1-1, except that graphite was used instead of lithium fluorosilicate as the active material. The graphite used here is graphite particles obtained by pulverizing natural graphite using a hammer mill, a pin mill, a ball mill, a jet mill, or the like. For example, in the case where a hammer mill is used, the natural graphite is preferably pulverized for 20 min or more at a rotation speed of 4000 rpm to 5000 rpm, both inclusive. Supply of natural graphite and discharge of the pulverized graphite particles are preferably performed by a method in which the natural graphite and the graphite particles are caught in an air current.

Figure 10:
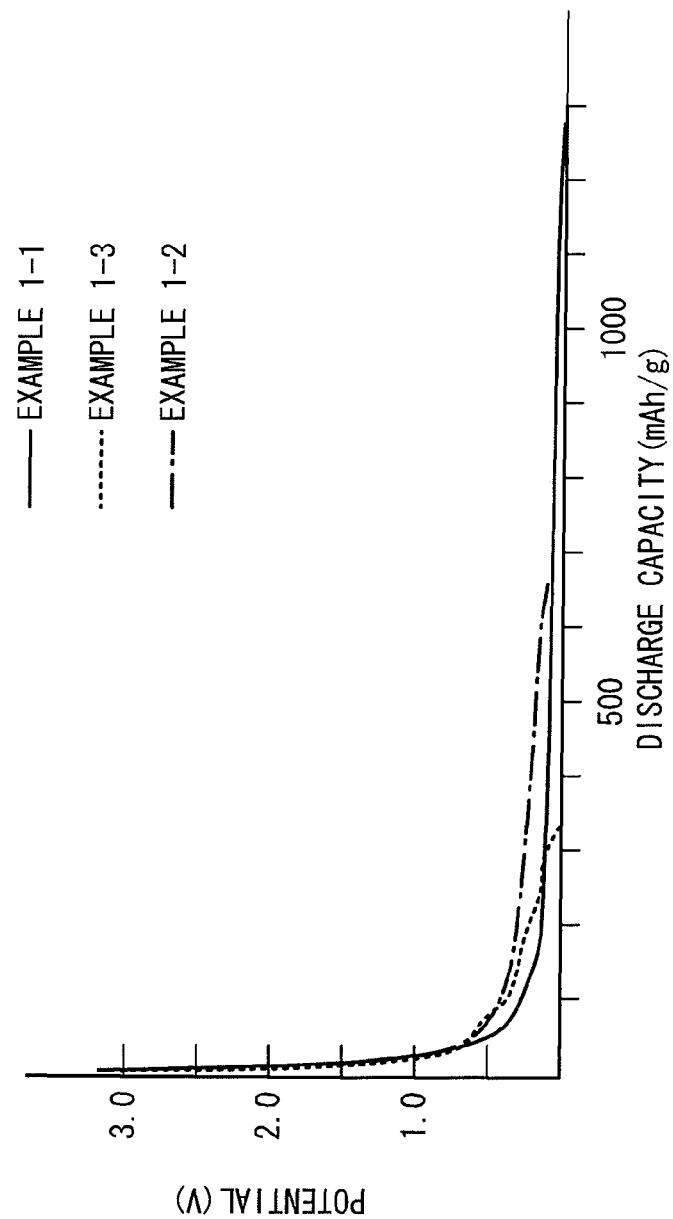
FIG. 10 is a characteristics diagram illustrating a relationship between discharge capacity per unit weight and electrode potential in experiment examples.

For the test cells of Examples 1-1 to 1-3 fabricated as above, the discharge capacity (mAh/g) was examined. Specifically, the discharge capacity was determined as follows. First, the test cell was constant-current charged with a constant current 1 C until the equilibrium potential reached 0 V to lithium, and was further constant-voltage charged with a constant voltage 0 V until the total amount of time from the start of constant-current charge reached four hours. After that, the test cell was discharged with a constant current of 1 C until the equilibrium potential reached 1.5 V to lithium, and the discharge capacity (mAh/g) per unit mass, in which the mass of the copper foil current collector and the binder was subtracted from the mass of the test electrode 71, was measured. Here, 1C is a current value at which theoretical capacity is completely discharged in one hour. The discharge capacity calculated as described above is based on the equilibrium potential. Thereby, the discharge capacity reflects the unique characteristics of the materials composing the active material layer of the test electrode 71. In addition, charge herein refers to insertion reaction of lithium into the active material layer 71B. The results of the obtained discharge capacity (mAh/g) are illustrated in Table 1. Further, FIG. 10 illustrates a discharge curve in the test cells of Examples 1-1 to 1-3. In FIG. 10, the discharge capacity (mAh/g) per unit mass is the horizontal axis, and the equilibrium potential (V) to lithium is the vertical axis.

TABLE 1

| Coin-type test cell | | |
|---|---|---|
| Table 1 | Active material of test electrode | Discharge capacity per unit weight (mAh/g) |
| Example 1-1 | Lithium fluorosilicate ($Li_2SiF_6$) | 1275 |
| Example 1-2 | Difluoride ($SiF_2$) | 680 |
| Example 1-3 | Graphite | 320 |

As illustrated in FIG. 10 and Table 1, it was confirmed that, in the case where lithium fluorosilicate ($Li_2SiF_6$) was used as the active material (Example 1-1), about twice the discharge capacity of the case where difluoride ($SiF_2$) was used (Example 1-2) and about four-times the discharge capacity of the case where graphite was used (Example 1-3) were obtained.

Example 2-1

Next, a cylindrical secondary battery including the anode 22 and the cathode 21 illustrated in FIG. 2 was fabricated. The anode 22 was an anode in which both faces of the anode current collector 22A were coated with mixed slurry similar to that used for the electrode in the foregoing Example 1-1, and the mixed slurry was dried. The resultant was then compression-molded by a rolling press machine or the like to form the anode active material layer 22B, and the anode lead 26 was then attached to one end of the anode current collector 22A. A strip-shaped copper foil with a thickness of 10 μm was used as the anode current collector 22A. The volume density of the anode active material layer 22B was 1.80 g/cm$^3$, and the thickness at one face of the anode active material layer 22B was 80 μm.

The cathode 21 was fabricated as follows. Specifically, first, lithium carbonate ($Li_2CO_3$) and cobalt carbonate ($CoCO_3$) were mixed at a molar ratio of $Li_2CO_3$:$CoCO_3$=0.5:1. After that, the mixture was fired in the air at 900 deg C. for 5 hours. Thereby, lithium-cobalt composite oxide ($LiCoO_2$) was obtained. X-ray diffraction was performed on the obtained $LiCoO_2$, and the peak thereof matched well the peak of $LiCoO_2$ registered in the JCPDS (Joint Committee of Powder Diffraction Standard) file. Next, the lithium-cobalt composite oxide was pulverized into a powder state with a particle size of 15 μm at 50% cumulative volume obtained by laser diffraction method, thereby obtaining the cathode active material.

Then, 95% by mass of lithium-cobalt composite oxide powder and 5% by mass of lithium carbonate ($Li_2CO_3$) powder were mixed, and 91% by mass of the mixture, 6% by mass of graphite as a conductor, and 3% by mass of polyvinylidene fluoride as a binder were mixed. The resultant was dispersed in N-methyl-2-pyrrolidone to obtain cathode mixture slurry. Next, both faces of the cathode current collector 21A made of a strip-shaped aluminum foil with a thickness of 15 μm were uniformly coated with the cathode mixture slurry, which was dried. After that, the resultant was compression-molded by a roll pressing machine or the like to form the cathode active material layer 21B, thereby fabricating the cathode 21. At this time, the thickness at one face of the cathode active material layer 21B was 80 μm, and volume density was 3.55 g/cm³. Then, the cathode lead 25 made of aluminum was attached to one end of the cathode current collector 21A. At this time, the secondary battery is a lithium ion secondary battery in which the capacity of the anode 22 is expressed based on insertion and extraction of lithium. In other words, the thickness of the cathode active material layer 21B and the thickness of the anode active material layer 22B were each adjusted such that lithium is prevented from being precipitated on the anode 22 in the fully charged state.

After the cathode 21 and the anode 22 were respectively fabricated, with the separator 23 made of a micro-porous polyethylene stretch film with a thickness of 20 μm therebetween, the anode 22, the separator 23, the cathode 21, and the separator 23 were layered in this order, and wound numerous times to fabricate the jellyroll-shaped spirally wound electrode body 20. Next the spirally wound electrode body 20 was sandwiched between the pair of insulating plates 12 and 13. The anode lead 26 was welded to the battery can 11 and the cathode lead 25 was welded to the safety valve mechanism 15. The spirally wound electrode body 20 was contained within the battery can 11. Subsequently, the electrolytic solution was injected into the battery can 11 by a decompression method or the like, and impregnated the separator 23. Finally, the battery cover 14 was caulked to the battery can 11 with the gasket 17, thereby the cylindrical secondary battery having an outer diameter of 18 mm and a height of 65 mm was fabricated.

At this time, as the electrolytic solution, an electrolytic solution obtained by dissolving $LiPF_6$ as an electrolyte salt into a mixed solvent of ethylene carbonate (EC), diethyl carbonate (DEC), propylene carbonate (PC), and vinyl ethylene carbonate (VEC) mixed at a mass ratio of 50:30:17:3 was used. Here, the content of $LiPF_6$ to the mixed solvent was 1.0 mol/kg.

Example 2-2

A cylindrical secondary battery (FIG. 2) of Example 2-2 was fabricated in the same manner as that of Example 2-1, except that silicon difluoride ($SiF_2$) was used instead of lithium fluorosilicate as the anode active material.

Example 2-3

A cylindrical secondary battery (FIG. 2) of Example 2-3 was fabricated in the same manner as that of Example 2-1, except that graphite was used instead of lithium fluorosilicate as the anode active material.

Example 2-4

A cylindrical secondary battery (FIG. 2) of Example 2-4 was fabricated in the same manner as that of Example 2-1, except that lithium fluorosilicate and graphite in equal amounts (500 g) were used as the anode active material.

Example 2-5

A cylindrical secondary battery (FIG. 2) of Example 2-5 was fabricated in the same manner as that of Example 2-1, except that polyvinylidene fluoride was not added as a fluorine-containing compound to the anode active material layer 22B, and heat treatment was not performed.

Figure 11:
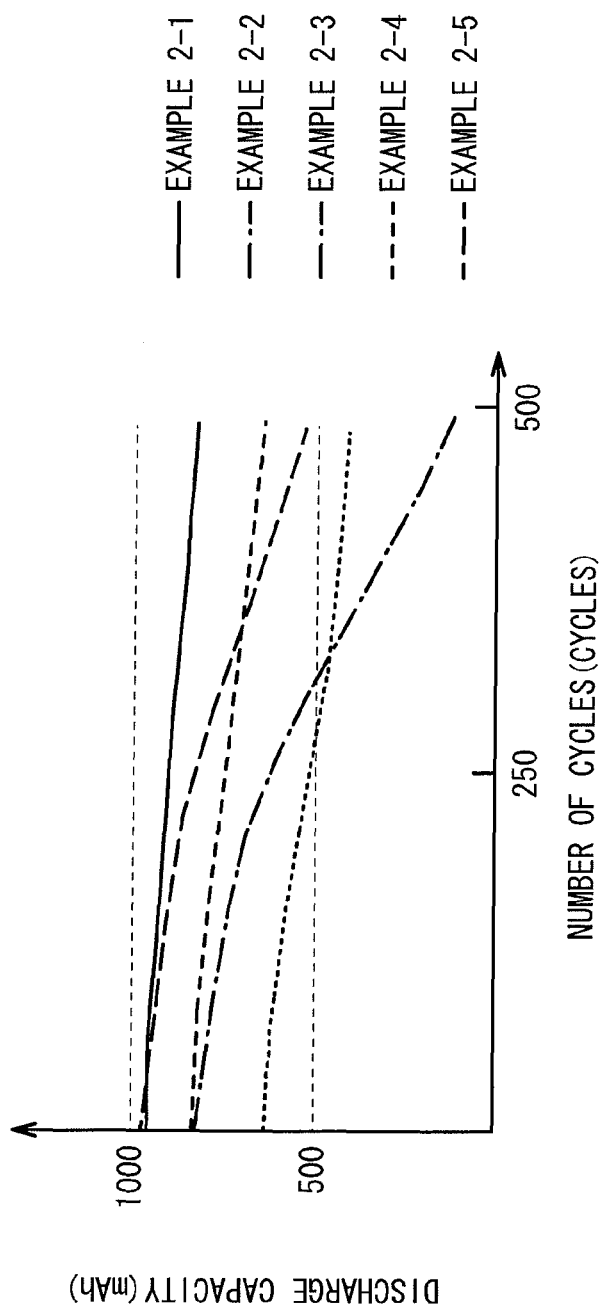
FIG. 11 is a characteristics diagram illustrating a relationship between discharge capacity and number of cycles in the experiment examples.

For the secondary batteries of Examples 2-1 to 2-5 fabricated as above, charge and discharge operation was performed a plurality of times, and the battery capacity and the cycle characteristics (discharge capacity retention ratio) were examined. At this time, regarding charge, after constant-current charge was performed at a constant current of 0.7 C until the battery voltage reached 4.2 V, constant-voltage charge was then performed at a constant voltage of 4.2 V until the current density reached 0.03 mA/cm². Regarding discharge, constant-current discharge was performed at a constant current of 1 C until the battery voltage reached 3.0 V. With the battery capacity being the initial discharge capacity (discharge capacity at the first cycle), the cycle characteristics (discharge capacity retention ratio) is a ratio of the discharge capacity of the 500th cycle to the initial discharge capacity (discharge capacity at the first cycle), that is (discharge capacity at the 500th cycle/discharge capacity at the first cycle)× 100(%). The measurement results of the battery capacity (mAh) and the cycle characteristics (discharge capacity retention ratio (%)) are illustrated in Table 2. FIG. 11 illustrates the changes in discharge capacity in the secondary batteries of the Examples 2-1 to 2-5. In FIG. 11, the number of cycles (cycle) is the horizontal axis, and the battery capacity (mAh) is the vertical axis. In addition, the expansion rate after 500 cycles with the state before charge and discharge as reference was measured, and is also illustrated in Table 2. The expansion rate herein refers to the thickness of the anode after 500 cycles to the thickness of the anode before charge and discharge.

TABLE 2

| | cylindrical-type | | | | | |
|---|---|---|---|---|---|---|
| | Composition ratio of anode active material (% by weight) | | | Battery capacity | Discharge capacity retention | Expansion |
| Table 2 | $Li_2SiF_6$ | $SiF_2$ | Graphite | (mAh) | ratio (%) | ratio (%) |
| Example 2-1 | 100 | 0 | 0 | 950 | 84.2 | 30 |
| Example 2-2 | 0 | 100 | 0 | 800 | 61.5 | 225 |
| Example 2-3 | 0 | 0 | 100 | 600 | 75.0 | 29 |
| Example 2-4 | 50 | 0 | 50 | 845 | 82.8 | 29.5 |
| Example 2-5 | 100 | 0 | 0 | 950 | 10.2 | 105 |

As illustrated in FIG. 11 and Table 2, in the case where lithium fluorosilicate is included as the anode active material (Examples 2-1, 2-4, and 2-5), the cycle characteristics are able to be improved compared to the case where only graphite is used as the anode active material. In particular, in the case where the anode active material layer 22 contains polyvinylidene fluoride (Examples 2-1 and 2-4), it is confirmed that the cycle characteristics are able to be further improved while retaining almost the same low expansion ratio. This is considered to be a result of reaction between lithium fluorosilicate and acid impurities being inhibited since the lithium atoms of lithium fluorosilicate ($Li_2SiF_6$) forming an octahedron structure and the fluorine atoms of polyvinylidene fluoride form an electrostatically stable state and provide sterical hinder. Meanwhile, in Example 2-2, although the anode active material layer 22 contains silicon difluoride and polyvinylidene fluoride, deterioration of the cycle characteristics was not able to be prevented. A reason for this is considered that the anode active material because SiF⁻ and dissolved, and expansion due to sudden excessive formation of the SEI coating occurred, as a result of increased concentration of acidic impurities (such as HF) within the electrolytic solution accompanying increase in the number of cycles.

In addition, for the secondary batteries of Examples 2-1 to 2-5, the electric potentials of the cathode 21 and the anode 22 with the oxidation-reduction potential of lithium as reference were measured, and are illustrated in Table 3. Further, the electric potentials of the cathode 21 and the anode 22 (with the oxidation-reduction potential of lithium as reference) in the case where the maximum battery voltage at the time of charge is 4.35 V were similarly measured, and are also illustrated in Table 3.

TABLE 3

| | Cylindrical-type | | | | | |
|---|---|---|---|---|---|---|
| | Composition ratio of anode active material (% by weight) | | | Charge voltage 4.2 V | | Charge voltage 4.35 V | |
| Table 3 | $Li_2SiF_6$ | $SiF_2$ | Graphite | Cathode potential (V) | Anode potential (V) | Cathode potential (V) | Anode potential (V) |
| Example 2-1 | 100 | 0 | 0 | 4.25 | 0.05 | 4.39 | 0.04 |
| Example 2-2 | 0 | 100 | 0 | 4.35 | 0.15 | 4.47 | 0.12 |
| Example 2-3 | 0 | 0 | 100 | 4.3 | 0.1 | 4.43 | 0.08 |
| Example 2-4 | 50 | 0 | 50 | 4.28 | 0.08 | 4.41 | 0.06 |
| Example 2-5 | 100 | 0 | 0 | 4.25 | 0.05 | 4.39 | 0.04 |

As illustrated in Table 3, in the case where lithium fluorine silicate is included as the anode active material (Examples 2-1, 2-4, and 2-5, the cathode potential and the anode potential are both positioned toward the base side by 0.4 V to 0.5 V, both inclusive, compared to the case where only graphite is used as the anode active material. Thus, lithium precipitation in the anode is inhibited, and the secondary battery becomes further structurally stable. In addition, since the cathode potential is less than 4.4 V with the oxidation-reduction potential of lithium as reference, oxidative decomposition of the electrolytic solution solvent does not easily occur. Oxidative decomposition of a solvent such as this may caused deterioration of various characteristics as secondary reaction factor inhibiting charge and discharge reaction. However, such concern does not arise in the present disclosure.

From the results of the foregoing respective examples, it was found that according to the lithium ion secondary battery of the disclosure, higher capacity and improved cycle characteristics are able to be actualized by use of lithium fluorosilicate as the anode active material. In particular, if a coating is formed on the anode active material in advance by a fluorine-containing compound such as polyvinylidene fluoride, it is confirmed that further superior cycle characteristics are able to be obtained.

The disclosure has been described with reference to the embodiments and the examples. However, the disclosure is not limited to the foregoing embodiments and the foregoing examples, and various modifications may be made. For example, in the foregoing embodiments and examples, the description has been given of the case in which the battery structure is the cylindrical type, the laminated film type, or the square type, and of the case in which the battery element has the spirally wound structure. However, the battery structure is not limited thereto, and the disclosure is similarly applicable to a case that the battery structure is a coin-type or a button-type, or a case that the battery element has a laminated structure or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An anode for a lithium ion secondary battery comprising:
    an anode current collector; and
    an anode active material layer, wherein the anode active material layer comprises: $Li_xSiF_y$ ($1 \leq x \leq 2$ and $5 \leq y \leq 6$) and polyvinylidene fluoride (PVDF).

2. The anode for a lithium ion secondary battery according to claim 1, wherein the $Li_xSiF_y$ ($1 \leq x \leq 2$ and $5 \leq y \leq 6$) is $Li_2SiF_6$.

3. The anode for a lithium ion secondary battery according to claim 1, wherein the anode active material layer further comprises graphite.

4. The anode for a lithium ion secondary battery according to claim 1, wherein the content of polyvinylidene fluoride is 0.1 parts by weight to 10 parts by weight, both inclusive, when the content of $Li_xSiF_y$ ($1 \leq x \leq 2$ and $5 \leq y \leq 6$) is 100 parts by weight.

5. A lithium ion secondary battery comprising:
    a cathode;
    an anode; and
    an electrolyte,
    wherein the anode comprises:
        an anode current collector; and
        an anode active material layer on the anode current collector, wherein the anode active material layer comprises $Li_xSiF_y$ ($1 \leq x \leq 2$ and $5 \leq y \leq 6$) and polyvinylidene fluoride (PVDF).

6. The lithium ion secondary battery according to claim 5, wherein the $Li_xSiF_y$ ($1 \leq x \leq 2$ and $5 \leq y \leq 6$) is $Li_2SiF_6$.

7. The lithium ion secondary battery according to claim 5, wherein the content of polyvinylidene fluoride is 0.1 parts by weight to 10 parts by weight, both inclusive, when the content of $Li_xSiF_y$ ($1 \leq x \leq 2$ and $5 \leq y \leq 6$) is 100 parts by weight.

8. An electric power tool acting with the use of a lithium ion secondary battery, wherein the lithium ion secondary battery comprises:
   a cathode;
   an anode;
   and an electrolytic solution as a power source;
   wherein the anode comprises:
   an anode current collector; and
   an anode active material layer on the anode current collector, wherein the anode active material layer comprises: $Li_xSiF_y$ ($1 \leq x \leq 2$ and $5 \leq y \leq 6$) and polyvinylidene fluoride (PVDF).

9. An electrical vehicle acting with the use of a lithium ion secondary battery, wherein the lithium ion secondary battery comprises:
   a cathode;
   an anode;
   and an electrolytic solution as a power source,
   wherein the anode comprises:
   an anode current collector; and
   an anode active material layer on the anode current collector, wherein the anode active material layer comprises: $Li_xSiF_y$ ($1 \leq x \leq 2$ and $5 \leq y \leq 6$) and polyvinylidene fluoride (PVDF).

10. An electric power storage system acting with the use of a lithium ion secondary battery, wherein the lithium ion secondary battery comprises:
    a cathode;
    an anode;
    and an electrolytic solution as a power storage source,
    wherein the anode comprises:
    an anode current collector;
    an anode active material layer on the anode current collector, wherein the anode active material layer comprises: $Li_xSiF_y$ ($1 \leq x \leq 2$ and $5 \leq y \leq 6$) and polyvinylidene fluoride (PVDF).

* * * * *